United States Patent
Geng

(10) Patent No.: US 11,074,924 B2
(45) Date of Patent: Jul. 27, 2021

(54) SPEECH RECOGNITION METHOD, DEVICE, APPARATUS AND COMPUTER-READABLE STORAGE MEDIUM

(71) Applicant: Baidu Online Network Technology (Beijing) Co., Ltd, Beijing (CN)

(72) Inventor: Lei Geng, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 81 days.

(21) Appl. No.: 16/214,539

(22) Filed: Dec. 10, 2018

(65) Prior Publication Data

US 2019/0325888 A1 Oct. 24, 2019

(30) Foreign Application Priority Data

Apr. 20, 2018 (CN) .......................... 201810361397.5

(51) Int. Cl.
*G10L 21/0216* (2013.01)
*G10L 15/22* (2006.01)
*G10L 21/0208* (2013.01)

(52) U.S. Cl.
CPC .......... *G10L 21/0216* (2013.01); *G10L 15/22* (2013.01); *G10L 2021/02082* (2013.01); *G10L 2021/02166* (2013.01)

(58) Field of Classification Search
CPC ............................. G10L 15/22; G10L 21/0216
See application file for complete search history.

(56) References Cited

U.S. PATENT DOCUMENTS 9,595,997 B1 * 3/2017 Yang ................... G10L 21/0208
9,633,661 B1 * 4/2017 Typrin ................... G10L 17/22
(Continued)

FOREIGN PATENT DOCUMENTS

CN 206312567 U 7/2017
CN 107274901 A 10/2017
(Continued)

OTHER PUBLICATIONS

Notice of Reasons for Refusal issued in connection with corresponding Japanese Patent Application No. 2018-233967, dated Feb. 13, 2020.
(Continued)

*Primary Examiner* — Shaun Roberts
(74) *Attorney, Agent, or Firm* — Akerman LLP

(57) ABSTRACT

A speech recognition method, device, apparatus and a computer-readable storage medium are provided. The method includes: starting a part of a microphone array to acquire a first speech signal; performing an echo cancellation process for the first speech signal to obtain a second speech signal; performing wakeup recognition for the second speech signal, to determine whether a wakeup word is included in the second speech signal; starting the microphone array to acquire a third speech signal, in the case that the wakeup word is included in the second speech signal; performing noise reduction for the third speech signal; and performing speech recognition for a noise-reduced signal. Computational load and power consumption during the speech recognition can be greatly reduced, because most processes of the front-end noise reduction algorithm are not started before the wakeup state and only a part of a microphone array is started.

10 Claims, 6 Drawing Sheets

(56) References Cited

U.S. PATENT DOCUMENTS

| | | | |
|---|---|---|---|
| 10,134,425 B1* | 11/2018 | Johnson, Jr. | G10L 25/87 |
| 10,192,546 B1* | 1/2019 | Piersol | G10L 15/08 |
| 10,304,475 B1* | 5/2019 | Wang | G10L 21/0216 |
| 2010/0081487 A1* | 4/2010 | Chen | H04M 9/082 |
| | | | 455/575.1 |
| 2010/0292987 A1 | 11/2010 | Kawaguchi et al. | |
| 2014/0278435 A1* | 9/2014 | Ganong, III | G10L 15/22 |
| | | | 704/275 |
| 2015/0221307 A1* | 8/2015 | Shah | G06F 1/3293 |
| | | | 704/253 |
| 2015/0277885 A1* | 10/2015 | Kimoto | G06F 8/61 |
| | | | 717/174 |
| 2016/0293168 A1 | 10/2016 | Chen | |
| 2016/0306758 A1* | 10/2016 | Lu | G06F 13/28 |
| 2017/0213553 A1* | 7/2017 | Gunn | G06F 1/3206 |
| 2018/0247065 A1* | 8/2018 | Rhee | G06F 21/32 |
| 2018/0366117 A1* | 12/2018 | Carreras | G10L 21/0216 |
| 2019/0033446 A1* | 1/2019 | Bultan | G01S 15/06 |
| 2019/0080692 A1* | 3/2019 | R | G10L 21/0272 |
| 2019/0096398 A1* | 3/2019 | Sereshki | G10L 21/0208 |
| 2019/0130885 A1* | 5/2019 | Kemmerer | H04R 3/005 |

FOREIGN PATENT DOCUMENTS

| | | |
|---|---|---|
| CN | 107316649 A | 11/2017 |
| CN | 107369445 A | 11/2017 |
| CN | 107577449 A | 1/2018 |
| CN | 107591151 A | 1/2018 |
| CN | 108369476 A | 8/2018 |
| JP | H10276491 A | 10/1998 |
| JP | 2003-330490 A | 11/2003 |
| JP | 2010268324 A | 11/2010 |
| JP | 2013037174 A | 2/2013 |
| JP | 2016-167645 A | 9/2016 |
| WO | 2017/098775 A1 | 6/2017 |

OTHER PUBLICATIONS

Search Report issued in connection with corresponding Chinese Patent Application No. 2018103613975, dated Apr. 22, 2019.
First Office Action issued in connection with corresponding Chinese Application No. 2018103613975, dated Apr. 30, 2019.
Notice of Reasons for Refusal issued in connection with corresponding Japanese Patent Application No. 2018-233967, dated Jul. 7, 2020.

* cited by examiner

SPEECH RECOGNITION METHOD, DEVICE, APPARATUS AND COMPUTER-READABLE STORAGE MEDIUM

CROSS-REFERENCE TO RELATED APPLICATION

This application claims priority to Chinese Patent Application No. 201810361397.5, filed on Apr. 20, 2018, which is hereby incorporated by reference in its entirety.

TECHNICAL FIELD

The present application relates to a field of speech recognition technology, and in particular, to a speech recognition method, device, apparatus and a computer-readable storage medium.

BACKGROUNDS

With the rapid development of far-field speech recognition technology, an intelligent speech interaction is becoming one of the important interactive portals, and there have recently been full-blown intelligent hardware products integrated with far-field speech recognition technology. The demands for low power consumption of smart home, especially portable smart hardware, are becoming more and more outstanding.

In accordance with researches and actual tests, the front-end noise reduction algorithm of the microphone array has a great demand for the computing capability of the processor chip of the hardware device in the application of far-field speech recognition technology, and thus the power consumption is large.

In the current application of the front-end noise reduction algorithm for the far-field speech, the microphone array is always in the recording state, all of the front-end noise reduction algorithm is in the operating state, and the speech wakeup engine and the speech recognition engine are always in the operating state, which greatly increase the computational load of the processor chip of the hardware device to make the power consumption greatly improved.

SUMMARY

A speech recognition method, device, apparatus and a computer-readable storage medium are provided according to embodiments of the present application, so as to at least solve the above technical problems in the existing technology.

According to a first aspect, a speech recognition method includes: starting a part of a microphone array to acquire a first speech signal; performing an echo cancellation process for the first speech signal to obtain a second speech signal; performing wakeup recognition for the second speech signal to determine whether a wakeup word is included in the second speech signal; starting the microphone array to acquire a third speech signal, in the case that the wakeup word is included in the second speech signal; performing noise reduction for the third speech signal; and performing speech recognition for a noise-reduced signal.

In conjunction with the first aspect, in a first implementation of the first aspect of the present application, the performing noise reduction for the third speech signal includes: performing the echo cancellation process for the third speech signal to obtain a fourth speech signal; performing a sound source location process for the fourth speech signal to obtain an angle of beam forming; performing a beam forming process for the fourth speech signal in accordance with the angle of beam forming; performing a noise suppression process for a beam-formed signal; performing a de-reverberation process for a noise-suppressed signal; and performing a nonlinear processing process for a de-reverberated signal.

In conjunction with the first aspect, in a second implementation of the first aspect of the present application, the performing wakeup recognition for the second speech signal includes: sending the second speech signal to a speech wakeup engine to perform the wakeup recognition.

In conjunction with the first aspect, in a third implementation of the first aspect of the present application, the performing speech recognition for a noise-reduced signal includes: sending a noise-reduced signal to a speech recognition engine for the speech recognition.

In conjunction with the first aspect, a first implementation of the first aspect, a second implementation of the first aspect and a third implementation of the first aspect, in a fourth implementation of the first aspect of the present application, the method further includes: setting one microphone of the microphone array as an operating state and other microphones as a non-operating state.

According to a second aspect, a speech recognition device includes: a first starting module configured to start a part of a microphone array to acquire a first speech signal; an echo cancellation module configured to perform an echo cancellation process for the first speech signal to obtain a second speech signal; a wakeup recognition module configured to perform wakeup recognition for the second speech signal to determine whether a wakeup word is included in the second speech signal; a second starting module configured to start the microphone array to acquire a third speech signal, in the case that the wakeup word is included in the second speech signal; a noise reduction module configured to perform noise reduction for the third speech signal; and a speech recognition module configured to perform speech recognition for a noise-reduced signal.

In conjunction with the second aspect, in a first implementation of the second aspect of the present application, the noise reduction module includes: an echo cancellation submodule configured to perform an echo cancellation process for the third speech signal to obtain a fourth speech signal; a sound source location submodule configured to perform a sound source location process for the fourth speech signal to obtain an angle of beam forming; a beam forming submodule configured to perform a beam forming process for the fourth speech signal in accordance with the angle of beam forming; a noise suppression submodule configured to perform a noise suppression process for a beam-formed signal; a de-reverberation submodule configured to perform a de-reverberation process for a noise-suppressed signal; and a nonlinear processing submodule configured to perform a nonlinear processing process for a de-reverberated signal.

In conjunction with the second aspect, in a second implementation of the second aspect of the present application, the wakeup recognition module is further configured to: send the second speech signal to a speech wakeup engine to perform the wakeup recognition.

In conjunction with the second aspect, in a third implementation of the second aspect of the present application, the speech recognition module is further configured to: send a noise-reduced signal to a speech recognition engine for the speech recognition.

In conjunction with the second aspect, a first implementation of the second aspect, a second implementation of the second aspect and a third implementation of the second aspect, in a fourth implementation of the second aspect of the present application, the device further includes: a preset module configured to set one microphone of the microphone array as an operating state and the other microphones as a non-operating state.

In a third aspect, a speech recognition apparatus is provided according to an embodiment of the present application, the apparatus includes: one or more processors; and a storage device configured for storing one or more programs, wherein the one or more programs are executed by the one or more processors to enable the one or more processors to implement the method according to the first aspect.

The functions of the apparatus may be implemented by hardware, or by hardware executing corresponding software. The hardware or software includes one or more modules corresponding to the above functions.

In a possible design, the speech recognition apparatus includes a processor and a storage, the storage is configured to store a program for supporting the above speech recognition method executed by the speech recognition apparatus, the processor is configured to execute the program stored in the storage. The speech recognition apparatus further includes a communication interface configured for communication between the speech recognition apparatus and another apparatus or communication network.

In a fourth aspect, a computer-readable storage medium is provided for storing computer software instructions used by the speech recognition apparatus, the computer software instructions include programs involved in execution of the above speech recognition method.

One of the above technical solutions has the following advantages or beneficial effects: a part of a microphone array can first be started to acquire a speech signal and an echo cancellation process is performed for the speech signal, then the performed signal can be sent to a speech wakeup engine; thereafter, recording of the microphone array and other processes of the noise reduction algorithm can be started when a wakeup word has been recognized by the speech wakeup engine. Computational load and power consumption during the speech recognition can be greatly reduced, because most processes of the front-end noise reduction algorithm are not started before the wakeup state and only a part of the microphone array is started.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
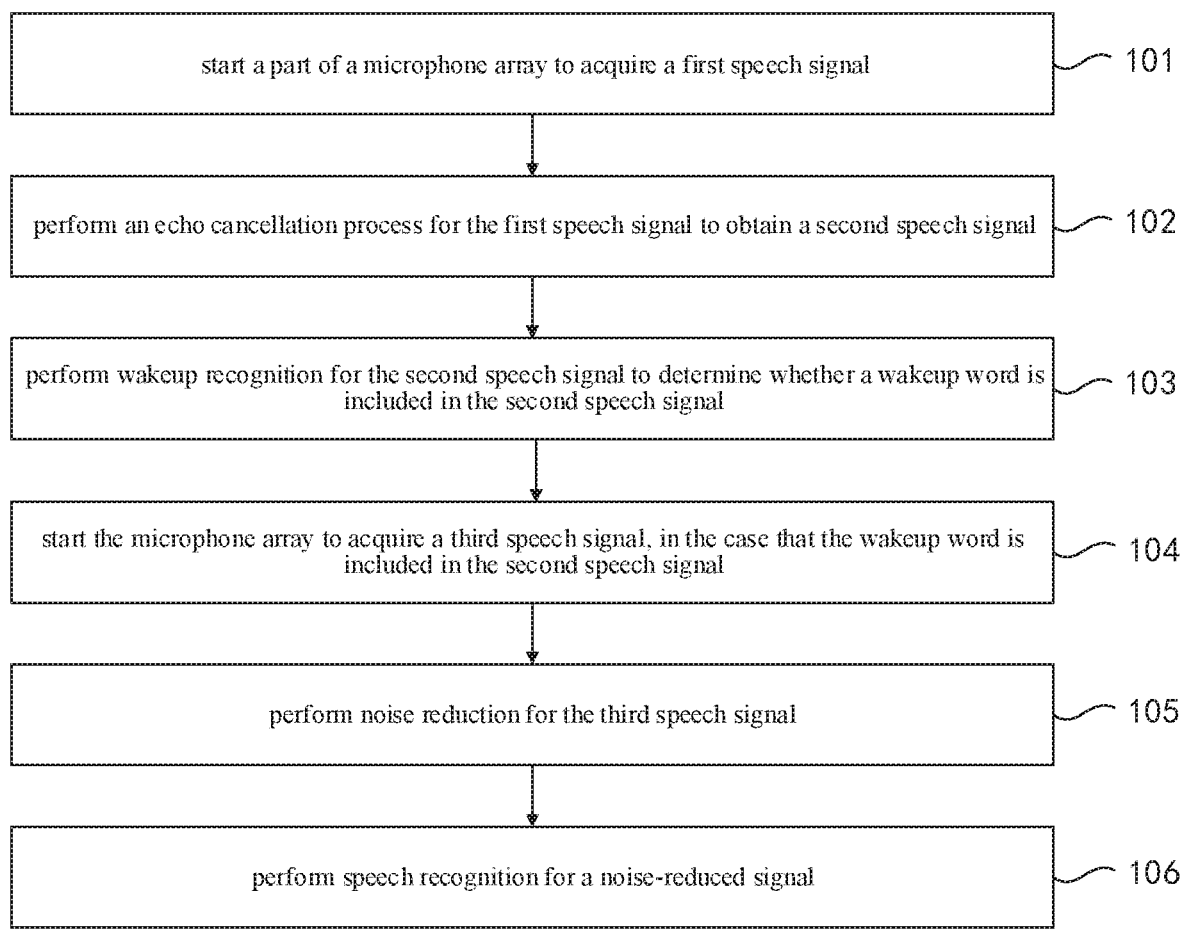
FIG. 1 shows a flowchart of a speech recognition method according to an embodiment of the present application.

FIG. 1 shows a flowchart of a speech recognition method according to an embodiment of the present application. As shown in FIG. 1, the speech recognition method may include steps 101 to 106.

At step 101, a part of a microphone array is started to acquire a first speech signal.

In an embodiment of the present application, a plurality of microphones are included in a microphone array of an apparatus. Two operating states may be preset. In a first operating state, only a part of the microphone array is started, and only an echo cancellation algorithm is executed by a processor chip; a speech wakeup engine is in an operating state. In a second operating state, all of the microphone array is started, and a front-end noise reduction algorithm is executed by a processor chip; both a speech wakeup engine and a speech recognition engine are in an operating state. The front-end noise reduction algorithm may include a plurality of processes such as an echo cancellation process, a sound source location process, a beam forming process, a noise suppression process, a de-reverberation process and a nonlinear processing process. An Acoustic Echo Control (AEC) algorithm may be used for the echo cancellation process.

Figure 2:
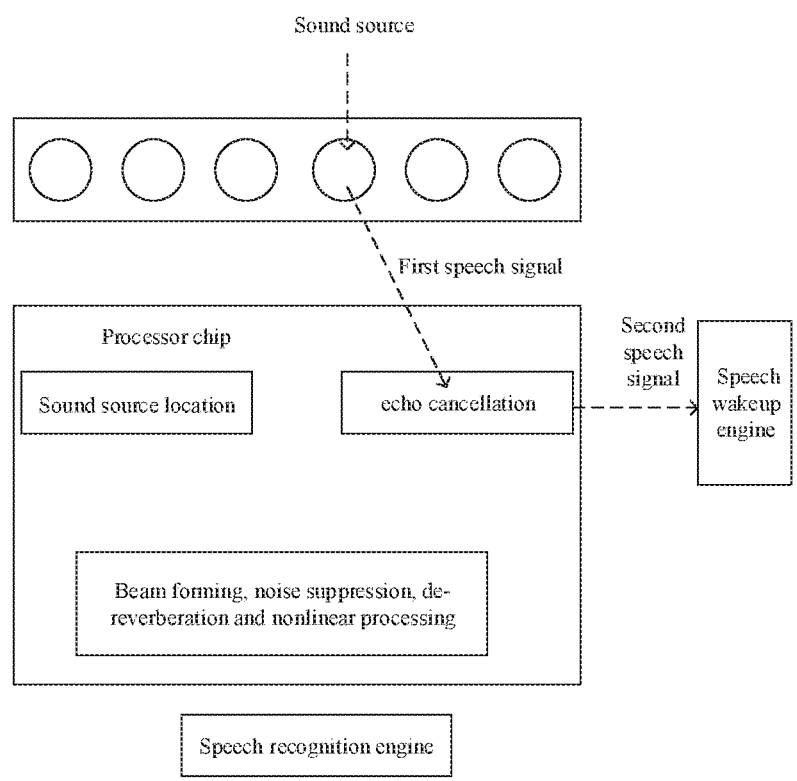
FIG. 2 shows a flowchart of a wakeup process in a speech recognition method according to an embodiment of the present application.

With reference to FIG. 2, after the apparatus is powered on, the apparatus can be by default in the first operating state. A part of the microphone array is started to acquire a first speech signal from a sound source, instead of all microphones, to reduce power consumption. The power consumption can be reduced at the extreme, in the case that only one microphone is started.

At step 102, an echo cancellation process is performed for the first speech signal to obtain a second speech signal.

In the first operating state, the echo cancellation process may be firstly performed for the first speech signal acquired by the part of the microphone array, without any other subsequent processes of the front-end noise reduction algorithm. This can further reduce power consumption.

At step 103, wakeup recognition is performed for the second speech signal to determine whether a wakeup word is included in the second speech signal.

With reference to FIG. 2, the second speech signal obtained by the echo cancellation process may be sent to a speech wakeup engine to perform wakeup recognition. A preset wakeup word can be retrieved by the speech wakeup engine. The second speech signal is converted to text information, and the similarity between the text information and a wakeup word is calculated to determine whether the wakeup word is included in the second speech signal. The wakeup word can be one or more, which can be flexibly selected in accordance with specific needs in practical use. The speech wakeup engine can also be called as a wakeup word recognition engine.

At step 104, the microphone array is started to acquire a third speech signal, in the case of determining the wakeup word is included in the second speech signal.

If it is recognized by the speech wakeup engine that a preset wakeup word is in the second speech signal, all microphones in the microphone array can be started to acquire a third speech signal again.

At step 105, noise reduction is performed for the third speech signal.

Figure 3:
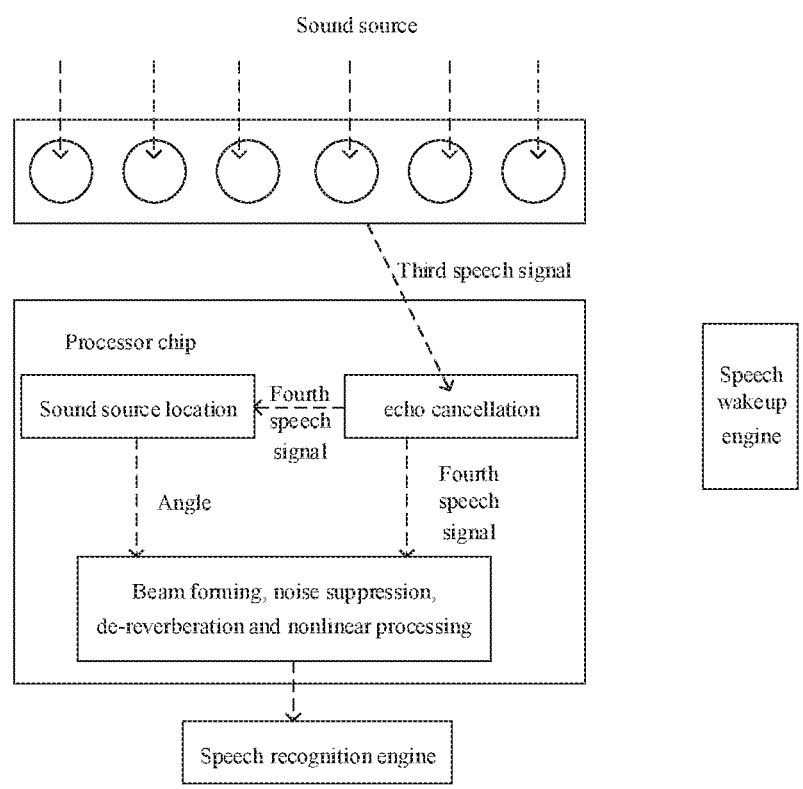
FIG. 3 shows a flowchart after wakeup in a speech recognition method according to an embodiment of the present application.

With reference to FIG. 3, a front-end noise reduction algorithm can be used by a processor chip to perform noise reduction for the third speech signal acquired again by all microphones.

At step 106, speech recognition is performed for a noise-reduced signal.

With reference to FIG. 3, a noise-reduced signal can be sent by a processor chip to a speech recognition engine to perform speech recognition. The speech recognition can also be called Automatic Speech Recognition (ASR).

Figure 4:
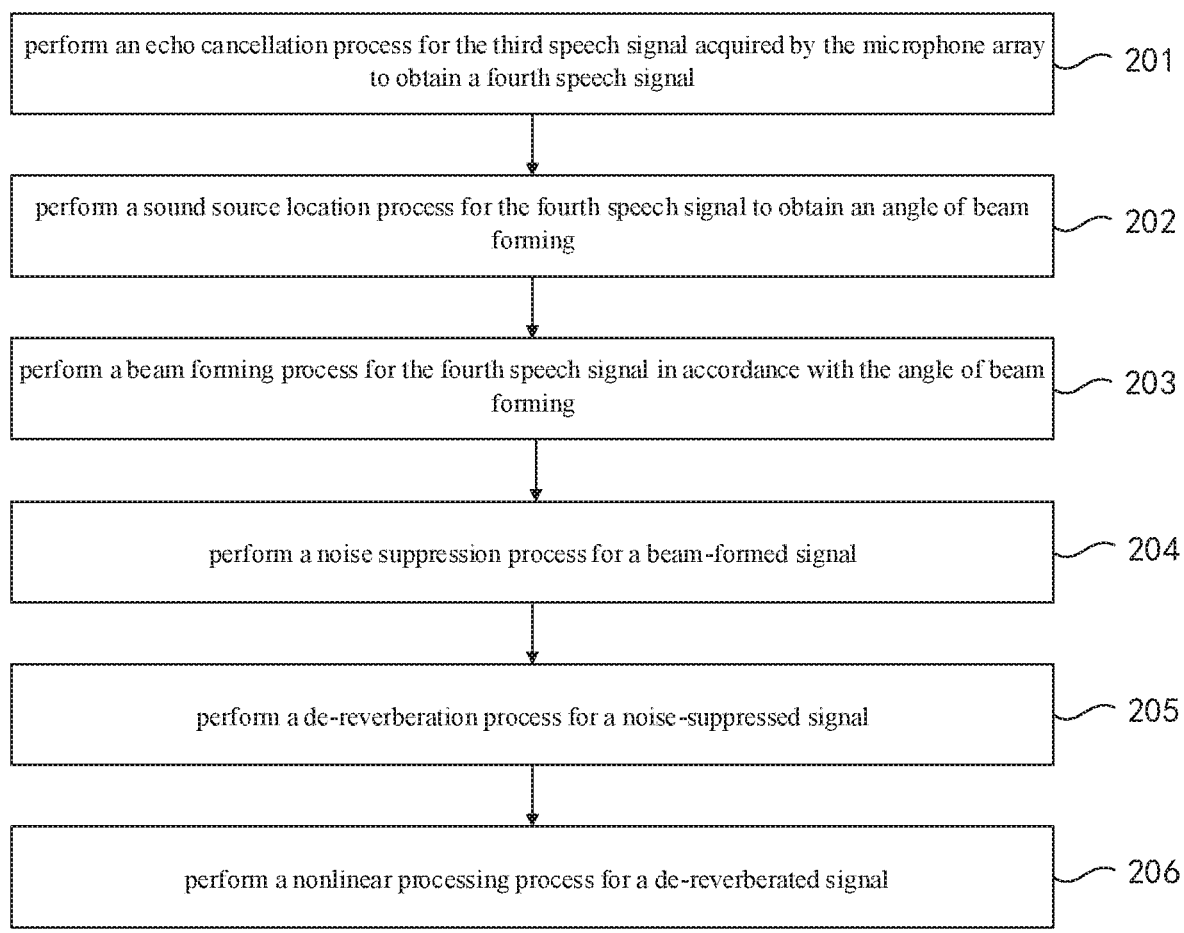
FIG. 4 shows a flowchart of a speech recognition method according to another embodiment of the present application.

FIG. 4 shows a flowchart of a speech recognition method according to another embodiment of the present application. As shown in FIG. 4 based on the foregoing embodiment, the step 105 of the speech recognition method can include:

Step 201, performing an echo cancellation process for the third speech signal acquired by the microphone array to obtain a fourth speech signal;

Step 202, performing a sound source location process for the fourth speech signal to obtain an angle of beam forming;

Step 203, performing a beam forming process for the fourth speech signal in accordance with the angle of beam forming;

Step 204, performing a noise suppression process for a beam-formed signal;

Step 205, performing a de-reverberation process for a noise-suppressed signal;

Step 206, performing a nonlinear processing process for a de-reverberated signal.

With reference to FIG. 3, all of the front-end noise reduction algorithm can be executed for the third speech signal acquired by all microphones in a microphone array. All of the front-end noise reduction algorithm can include processes such as an echo cancellation process, a sound source location process, a beam forming process, a noise suppression process, a de-reverberation process and a nonlinear processing process. Firstly, an echo cancellation process for the third speech signal can be performed to obtain a fourth speech signal. Secondly, a sound source location process can be performed for the fourth speech signal to obtain an angle of beam forming. Then, a beam forming process, a noise suppression process, a de-reverberation process and a nonlinear processing process can be performed for the fourth speech signal in accordance with the angle of beam forming.

In a possible implementation, the method further includes:

setting one microphone of a microphone array as an operating state, and the other microphones as a non-operating state.

In an initial power-on state, for example, the apparatus is by default in the first operating state, in which only one microphone is in an operating state and the other microphones are in a non-operating state. An echo cancellation process can be started only for the speech signal acquired by the one. After successful wakeup, the apparatus is changed to the second operating state. All microphones in a microphone array are in an operating state and all of the front-end noise reduction algorithm can be started for the speech acquired by the microphone array. The apparatus returns to the first operating state again after the end of the speech recognition.

In an embodiment of the present application, a part of a microphone array is firstly started to acquire a speech signal and perform an echo cancellation process for the speech signal, then the processed signal is sent to a speech wakeup engine; recording of the microphone array and other processes of the noise reduction algorithm are started when a wakeup word is recognized by the speech wakeup engine. Computational load and power consumption during the speech recognition can be greatly reduced, because most processes of the front-end noise reduction algorithm are not started before the wakeup state and only a part of a microphone array is started.

Figure 5:
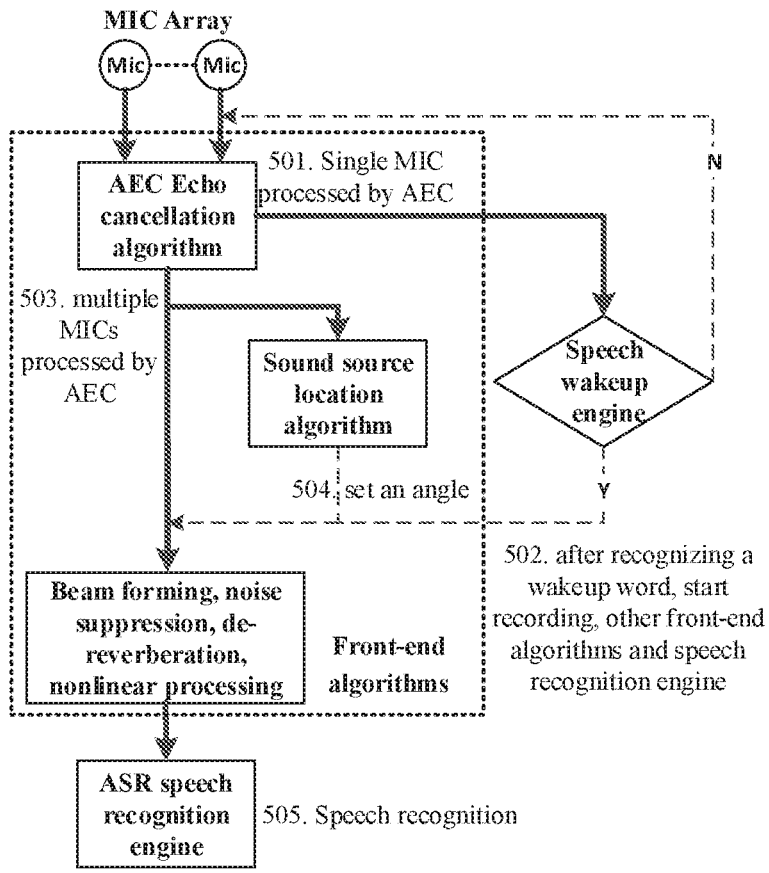
FIG. 5 shows a schematic diagram of an application example of a speech recognition method according to an embodiment of the present application.

FIG. 5 shows a schematic diagram of an application example of a speech recognition method according to another embodiment of the present application. As shown in FIG. 5, for example, only one microphone is started in the initial power-on state, and the front-end noise reduction algorithm is executed by a processor chip. The speech recognition method may include steps 501 to 505.

At step 501, after the apparatus is powered on, only one microphone (MIC) in a microphone array is in an operating state, only an echo cancellation algorithm is executed by a processor chip, and a speech wakeup engine is in an operating state. A single echo cancellation process such as an AEC process is performed by a processor chip for a speech signal acquired by a single MIC.

At step 502, the processed signal is sent to a speech wakeup engine which is in the operating state. The speech wakeup engine determines whether a wakeup word is recognized. In the case that no wakeup word is recognized, the current operating state is maintained and recording continues to be conducted by one microphone. In the case that the wakeup word is recognized by the speech wakeup engine, recording of the microphone array, other front-end algorithms and the speech recognition engine are started.

At step 503, after the AEC process is performed for a speech signal acquired by multiple MICs, the processed speech signal is input to a sound source location algorithm module, and a precise angle of beam forming is obtained through the sound source location algorithm.

At step 504, an angle of beam forming is set, and a beam forming algorithm is used for an audio signal on which the echo cancellation algorithm has been performed. After being subject to the algorithms such as noise suppression, de-reverberation and nonlinear processing, the processed audio signal is sent to a far-field speech recognition engine for speech recognition, such as an ASR speech recognition engine.

At step 505, the speech recognition is performed, and when the speech recognition is completed, the apparatus may return again to the operating state in which only the single microphone, the echo cancellation algorithm and the speech wakeup engine are started.

In the embodiment, after the apparatus is powered on, only one microphone in the microphone array is in an operating state to acquire a speech signal for single echo cancellation, and the processed signal can be sent to a speech wakeup engine in an operating state. After a wakeup word is recognized by the speech wakeup engine, an object of a sound source, such as a location information of a talking person, is obtained. Then, recording of a microphone array, other front-end algorithms and the speech recognition engine are started. Since most front-end algorithms are not started and a part of a microphone array is started before a wakeup state, the computational load of a processor chip can be greatly decreased. Thereby, the power consumption of the hardware can be greatly decreased, such as a microphone array and a processor chip.

Figure 6:
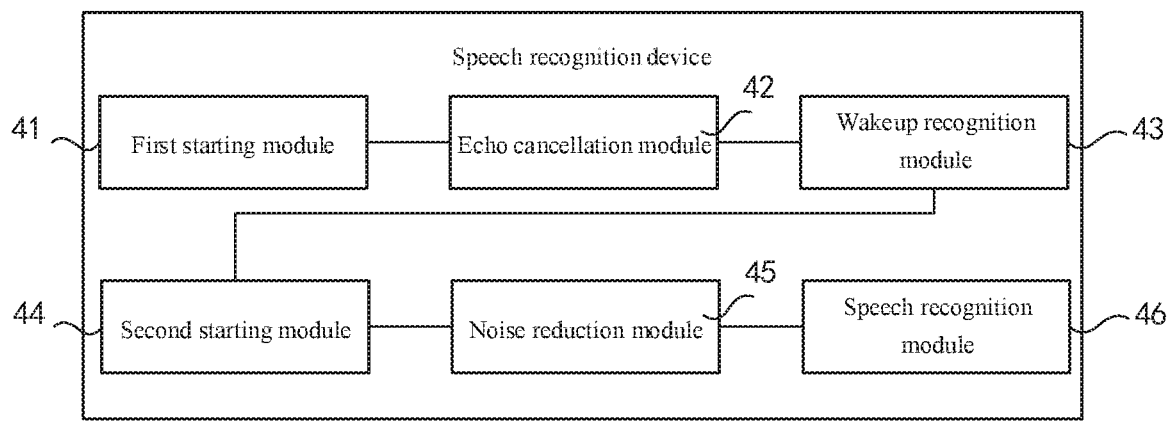
FIG. 6 is a structural block diagram of a speech recognition device according to an embodiment of the present application.

FIG. 6 is a structural block diagram of a speech recognition device according to an embodiment of the present application. As shown in FIG. 6, the device includes:

a first starting module 41 configured to start a part of a microphone array to acquire a first speech signal;

an echo cancellation module 42 configured to perform an echo cancellation process for the first speech signal to obtain a second speech signal;

a wakeup recognition module 43 configured to perform wakeup recognition for the second speech signal to determine whether a wakeup word is included in the second speech signal;

a second starting module 44 configured to start the microphone array to acquire a third speech signal, in the case that the wakeup word is included in the second speech signal;

a noise reduction module 45 configured to perform noise reduction for the third speech signal; and a speech recognition module 46 configured to perform speech recognition for a noise-reduced signal.

Figure 7:
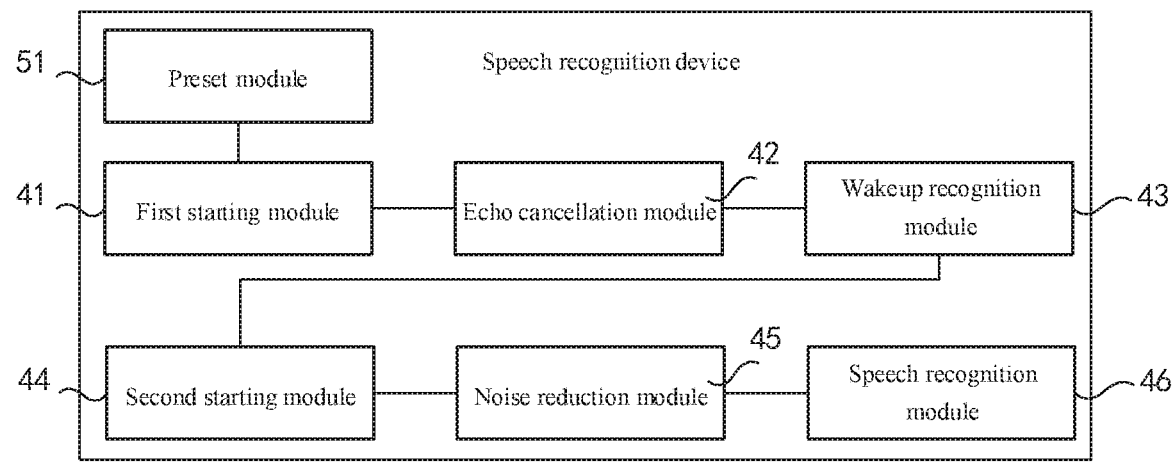
FIG. 7 is a structural block diagram of a speech recognition device according to another embodiment of the present application.

FIG. 7 is a structural block diagram of a speech recognition device according to another embodiment of the present application. As shown in FIG. 7, based on the above embodiment, the noise reduction module 45 of the device may include:

an echo cancellation submodule configured to perform an echo cancellation process for the third speech signal to obtain a fourth speech signal;

a sound source location submodule configured to perform a sound source location process for the fourth speech signal to obtain an angle of beam forming;

a beam forming submodule configured to perform a beam forming process for the fourth speech signal in accordance with the angle of beam forming;

a noise suppression submodule configured to perform a noise suppression process for a beam-formed signal;

a de-reverberation submodule configured to perform a de-reverberation process for a noise-suppressed signal; and a nonlinear processing submodule configured to perform a nonlinear processing process for a de-reverberated signal.

In a possible implementation, the wakeup recognition module 43 is further configured to send the second speech signal to a speech wakeup engine, to perform wakeup recognition.

In a possible implementation, the speech recognition module 46 is further configured to send a noise-reduced signal to a speech recognition engine, to perform speech recognition.

In an possible implementation, the device further includes:

a preset module 51 configured to set one microphone of a microphone array as an operating state and the other microphones as a non-operating state before starting a part of the microphone array to acquire a first speech signal.

In this embodiment, functions of modules in the device refer to the corresponding description of the above mentioned method and thus the description thereof is omitted herein.

Figure 8:
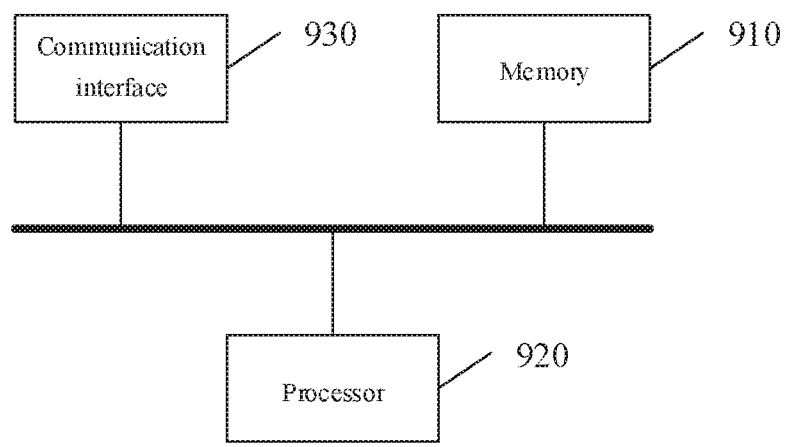
FIG. 8 is a structural block diagram of a speech recognition apparatus according to an embodiment of the present application.

FIG. 8 is a structural block diagram of a speech recognition apparatus according to an embodiment of the present application. As shown in FIG. 8, the speech recognition apparatus includes a memory 910 and a processor 920. The memory 910 stores a computer program executable on the processor 920. When the processor 920 executes the computer program, the speech recognition method in the foregoing embodiment is implemented. The number of the memory 910 and the processor 920 may be one or more.

The speech recognition apparatus further includes:

a communication interface 930 configured to communicate with an external device and exchange data.

The memory 910 may include a high-speed RAM memory and may also include a non-volatile memory, such as at least one magnetic disk memory.

If the memory 910, the processor 920, and the communication interface 930 are implemented independently, the memory 910, the processor 920, and the communication interface 930 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 8, but it does not mean that there is only one bus or one type of bus.

Optionally, in a specific implementation, if the memory 910, the processor 920, and the communication interface 930 are integrated on one chip, the memory 910, the processor 920, and the communication interface 930 may implement mutual communication through an internal interface.

According to an embodiment of the present application, a computer-readable storage medium is provided for storing computer software instructions, which include programs involved in execution of the above speech recognition method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A speech recognition method, comprising:
   starting a part of a microphone array to acquire a first speech signal;
   performing only an echo cancellation process, among processes of noise reduction, for the first speech signal acquired by the part of the microphone array to obtain a second speech signal;
   starting only a speech wakeup engine, among the speech wakeup engine and a speech recognition engine, to perform wakeup recognition for the second speech signal obtained by performing only the echo cancellation process, to determine whether a wakeup word is included in the second speech signal;
   starting all of the microphone array, to acquire a third speech signal in a case that the wakeup word is included in the second speech signal;
   performing the processes of noise reduction for the third speech signal acquired by the all of the microphone array; and
   performing speech recognition for a noise-reduced signal, wherein
   the performing the processes of noise reduction for the third speech signal comprises:
   performing the echo cancellation process for the third speech signal to obtain a fourth speech signal;
   performing a sound source location process for the fourth speech signal to obtain an angle of beam forming;
   performing a beam forming process for the fourth speech signal in accordance with the angle of beam forming;
   performing a noise suppression process for a beam-formed signal;
   performing a de-reverberation process for a noise-suppressed signal; and
   performing a nonlinear processing process for a de-reverberated signal.

2. The speech recognition method according to claim 1, wherein the performing wakeup recognition for the second speech signal comprises:
   sending the second speech signal to the speech wakeup engine to perform the wakeup recognition.

3. The speech recognition method according to claim 1, wherein the performing speech recognition for a noise-reduced signal comprises:
   sending the noise-reduced signal to the speech recognition engine for the speech recognition.

4. The speech recognition method according to claim 1, further comprising:
   setting one microphone of the microphone array as an operating state and the other microphones as a non-operating state.

5. A speech recognition device, comprising:
   a first starting module configured to start a part of a microphone array to acquire a first speech signal;
   an echo cancellation module configured to perform only an echo cancellation process, among processes of noise reduction, for the first speech signal acquired by the part of the microphone array to obtain a second speech signal;
   a wakeup recognition module configured to start only a speech wakeup engine, among the speech wakeup engine and a speech recognition engine, to perform wakeup recognition for the second speech signal obtained by performing only the echo cancellation process to determine whether a wakeup word is included in the second speech signal;
   a second starting module configured to start all of the microphone array, to acquire a third speech signal in a case that the wakeup word is included in the second speech signal;
   a noise reduction module configured to perform the processes of noise reduction for the third speech signal acquired by the all of the microphone array; and
   a speech recognition module configured to perform speech recognition for a noise-reduced signal, wherein the noise reduction module comprises:
   an echo cancellation submodule configured to perform the echo cancellation process for the third speech signal to obtain a fourth speech signal;
   a sound source location submodule configured to perform a sound source location process for the fourth speech signal to obtain an angle of beam forming;
   a beam forming submodule configured to perform a beam forming process for the fourth speech signal in accordance with the angle of beam forming;
   a noise suppression submodule configured to perform a noise suppression process for a beam-formed signal;
   a de-reverberation submodule configured to perform a de-reverberation process for a noise-suppressed signal; and
   a nonlinear processing submodule configured to perform a nonlinear processing process for a de-reverberated signal.

6. The speech recognition device according to claim 5, wherein the wakeup recognition module is further configured to:
   send the second speech signal to the speech wakeup engine for the wakeup recognition.

7. The speech recognition device according to claim 5, wherein the speech recognition module is further configured to:
   send the noise-reduced signal to the speech recognition engine for the speech recognition.

8. The speech recognition device according to claim 5, further comprising:
   a preset module configured to set one microphone of the microphone array as an operating state and the other microphones as a non-operating state.

9. A speech recognition apparatus, comprising:
   one or more processors; and
   a storage device configured for storing one or more programs, wherein
   the one or more programs are executed by the one or more processors to enable the one or more processors to implement the method of claim 1.

10. A non-transitory computer-readable storage medium, in which a computer program is stored, wherein the computer program, when executed by a processor, implements the method of claim 1.

* * * * *